United States Patent
Ishioka et al.

(10) Patent No.: US 12,091,009 B2
(45) Date of Patent: Sep. 17, 2024

(54) VEHICLE CONTROL DEVICE AND VEHICLE CONTROL METHOD

(71) Applicant: HONDA MOTOR CO., LTD., Tokyo (JP)

(72) Inventors: Atsushi Ishioka, Wako (JP); Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 598 days.

(21) Appl. No.: 16/715,461

(22) Filed: Dec. 16, 2019

(65) Prior Publication Data

US 2020/0189589 A1 Jun. 18, 2020

(30) Foreign Application Priority Data

Dec. 18, 2018 (JP) .................... 2018-236168

(51) Int. Cl.
B60W 30/17 (2020.01)

(52) U.S. Cl.
CPC ....... *B60W 30/17* (2013.01); *B60W 2554/801* (2020.02); *B60W 2720/10* (2013.01); *B60W 2754/30* (2020.02)

(58) Field of Classification Search
CPC . B60W 30/14; B60W 30/16162; B60W 30/17
See application file for complete search history.

(56) References Cited

U.S. PATENT DOCUMENTS

| 7,280,903 | B2 | 10/2007 | Arai et al. |
| 10,688,995 | B2 | 6/2020 | Shimakage |
| 10,967,877 | B2 | 4/2021 | Asakura et al. |

(Continued)

FOREIGN PATENT DOCUMENTS

| CN | 107408343 A | 11/2017 |
| JP | 2006-069419 A | 3/2006 |

(Continued)

OTHER PUBLICATIONS

Office Action dated Aug. 18, 2020 issued over the corresponding Japanese Patent Application No. 2018-236168 with the English translation thereof.

(Continued)

*Primary Examiner* — Imran K Mustafa
(74) *Attorney, Agent, or Firm* — Carrier, Shende & Associates P.C.; Joseph P. Carrier; Jeffrey T. Gedeon

(57) ABSTRACT

A vehicle control device includes an inter-vehicle distance determination unit that determines an inter-vehicle distance, and a following control unit that performs a following control with respect to a preceding vehicle on the basis of the inter-vehicle distance determined by the inter-vehicle distance determination unit. The following control includes a first control state, and a second control state in which a burden on the driver is lighter than in the first control state, or in which a degree of automation is higher than in the first control state. A minimum value of the inter-vehicle distance that can be determined by the inter-vehicle distance determination unit in the second control state is greater than a minimum value of the inter-vehicle distance that can be determined by the inter-vehicle distance determination unit in the first control state.

7 Claims, 7 Drawing Sheets

(56) References Cited

U.S. PATENT DOCUMENTS

| | | | | |
|---|---|---|---|---|
| 2009/0157276 A1* | 6/2009 | Kade | ............... | B60W 10/06 |
| | | | | 701/96 |
| 2016/0304092 A1* | 10/2016 | Rebhan | ............... | B60W 30/16 |
| 2017/0259822 A1* | 9/2017 | Schubert | ............... | B60W 30/17 |
| 2018/0237018 A1* | 8/2018 | Goto | ............... | B60W 30/14 |
| 2018/0292836 A1* | 10/2018 | Laur | ............... | G05D 1/0088 |

FOREIGN PATENT DOCUMENTS

| | | |
|---|---|---|
| JP | 4743251 B2 | 8/2011 |
| JP | 2019-053655 A | 4/2019 |
| WO | 2017/179193 A1 | 10/2017 |
| WO | 2018/055689 A1 | 3/2018 |

OTHER PUBLICATIONS

Office Action dated Apr. 6, 2021 issued over the corresponding Japanese Patent Application No. 2018-236168 with the English translation thereof.

Office Action including search report dated Sep. 21, 2022 issued over the corresponding Chinese Patent Application No. 201911309566.1 with an English translation of the pertinent portion.

Office Action dated Apr. 14, 2023 issued in the corresponding Chinese Patent Application No. 201911309566.1 with the English translation thereof.

* cited by examiner

VEHICLE CONTROL DEVICE AND VEHICLE CONTROL METHOD

CROSS-REFERENCE TO RELATED APPLICATION

This application is based upon and claims the benefit of priority from Japanese Patent Application No. 2018-236168 filed on Dec. 18, 2018, the contents of which are incorporated herein by reference.

BACKGROUND OF THE INVENTION

Field of the Invention

The present invention relates to a vehicle control device and a vehicle control method.

Description of the Related Art

In Japanese Patent No. 4743251, a following control device is disclosed in which a first inter-vehicle distance is set according to the traveling states of surrounding vehicles, a second inter-vehicle distance is set according to preferences of the driver, and a target inter-vehicle distance is set on the basis of the first inter-vehicle distance and the second inter-vehicle distance. In Japanese Patent No. 4743251, since the target inter-vehicle distance is set based on the first inter-vehicle distance and the second inter-vehicle distance, an inter-vehicle distance is ensured for which there is taken into consideration the surrounding environment and the preferences of the driver.

SUMMARY OF THE INVENTION

However, with the technique disclosed in Japanese Patent No. 4743251, the inter-vehicle distance may not always be set appropriately.

An object of the present invention is to provide a vehicle control device and a vehicle control method, which are capable of setting the inter-vehicle distance appropriately in accordance with a control state.

A vehicle control device according to one aspect of the present invention comprises an inter-vehicle distance determination unit configured to determine an inter-vehicle distance that is a distance between a host vehicle and a preceding vehicle, and a following control unit configured to perform a following control with respect to the preceding vehicle based on the inter-vehicle distance determined by the inter-vehicle distance determination unit, wherein the following control includes a first control state, and a second control state in which a burden on a driver is lighter than in the first control state, or in which a degree of automation is higher than in the first control state, and a minimum value of the inter-vehicle distance configured to be determined by the inter-vehicle distance determination unit in the second control state is greater than a minimum value of the inter-vehicle distance configured to be determined by the inter-vehicle distance determination unit in the first control state.

A vehicle control device according to another aspect of the present invention comprises an inter-vehicle distance determination unit configured to determine an inter-vehicle distance that is a distance between a host vehicle and a preceding vehicle, and a following control unit configured to perform a following control with respect to the preceding vehicle based on the inter-vehicle distance determined by the inter-vehicle distance determination unit, wherein the following control includes a first control state, and a second control state in which a burden on a driver is lighter than in the first control state, or in which a degree of automation is higher than in the first control state, and a maximum adjustable range of the inter-vehicle distance configured to be adjusted by the inter-vehicle distance determination unit in the second control state is narrower than a maximum adjustable range of the inter-vehicle distance configured to be adjusted by the inter-vehicle distance determination unit in the first control state.

A vehicle control device according to yet another aspect of the present invention comprises a relative positional relationship determination unit configured to determine a relative positional relationship between a host vehicle and a preceding vehicle, an inter-vehicle distance determination unit configured to determine an inter-vehicle distance that is a distance between the host vehicle and the preceding vehicle, based on the relative positional relationship determined by the relative positional relationship determination unit, and a following control unit configured to perform a following control with respect to the preceding vehicle based on the inter-vehicle distance determined by the inter-vehicle distance determination unit, wherein the following control includes a first control state, and a second control state in which a burden on a driver is lighter than in the first control state, or in which a degree of automation is higher than in the first control state, and in the first control state, the inter-vehicle distance determination unit determines the inter-vehicle distance based on the relative positional relationship determined by the relative positional relationship determination unit based on an operation made by a user, and in the second control state, the inter-vehicle distance determination unit determines the inter-vehicle distance based on a distance determined in advance.

A vehicle control method according to yet another aspect of the present invention comprises a step of determining an inter-vehicle distance that is a distance between a host vehicle and a preceding vehicle, and a step of performing a following control with respect to the preceding vehicle based on the inter-vehicle distance determined in the step of determining the inter-vehicle distance, wherein the following control includes a first control state, and a second control state in which a burden on a driver is lighter than in the first control state, or in which a degree of automation is higher than in the first control state, and a minimum value of the inter-vehicle distance configured to be determined in the step of determining the inter-vehicle distance in the second control state is greater than a minimum value of the inter-vehicle distance configured to be determined in the step of determining the inter-vehicle distance in the first control state.

A vehicle control method according to yet another aspect of the present invention comprises a step of determining an inter-vehicle distance that is a distance between a host vehicle and a preceding vehicle, and a step of performing a following control with respect to the preceding vehicle based on the inter-vehicle distance determined in the step of determining the inter-vehicle distance, wherein the following control includes a first control state, and a second control state in which a burden on a driver is lighter than in the first control state, or in which a degree of automation is higher than in the first control state, and a maximum adjustable range of the inter-vehicle distance configured to be adjusted in the second control state is narrower than a maximum adjustable range of the inter-vehicle distance configured to be adjusted in the first control state.

A vehicle control method according to yet another aspect of the present invention comprises a step of determining a relative positional relationship between a host vehicle and a preceding vehicle, a step of determining an inter-vehicle distance that is a distance between the host vehicle and the preceding vehicle, based on the relative positional relationship determined in the step of determining the relative positional relationship, and a step of performing a following control with respect to the preceding vehicle based on the inter-vehicle distance determined in the step of determining the inter-vehicle distance, wherein the following control includes a first control state, and a second control state in which a burden on a driver is lighter than in the first control state, or in which a degree of automation is higher than in the first control state, and in the first control state, the inter-vehicle distance is determined based on the relative positional relationship determined based on an operation made by a user, and in the second control state, the inter-vehicle distance is determined based on a distance determined in advance.

According to the present invention, the vehicle control device and the vehicle control method can be provided, which are capable of setting the inter-vehicle distance appropriately in accordance with a control state.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A preferred embodiment of a vehicle control device and a vehicle control method according to the present invention will be presented and described in detail below with reference to the accompanying drawings.

Embodiment

Figure 1:
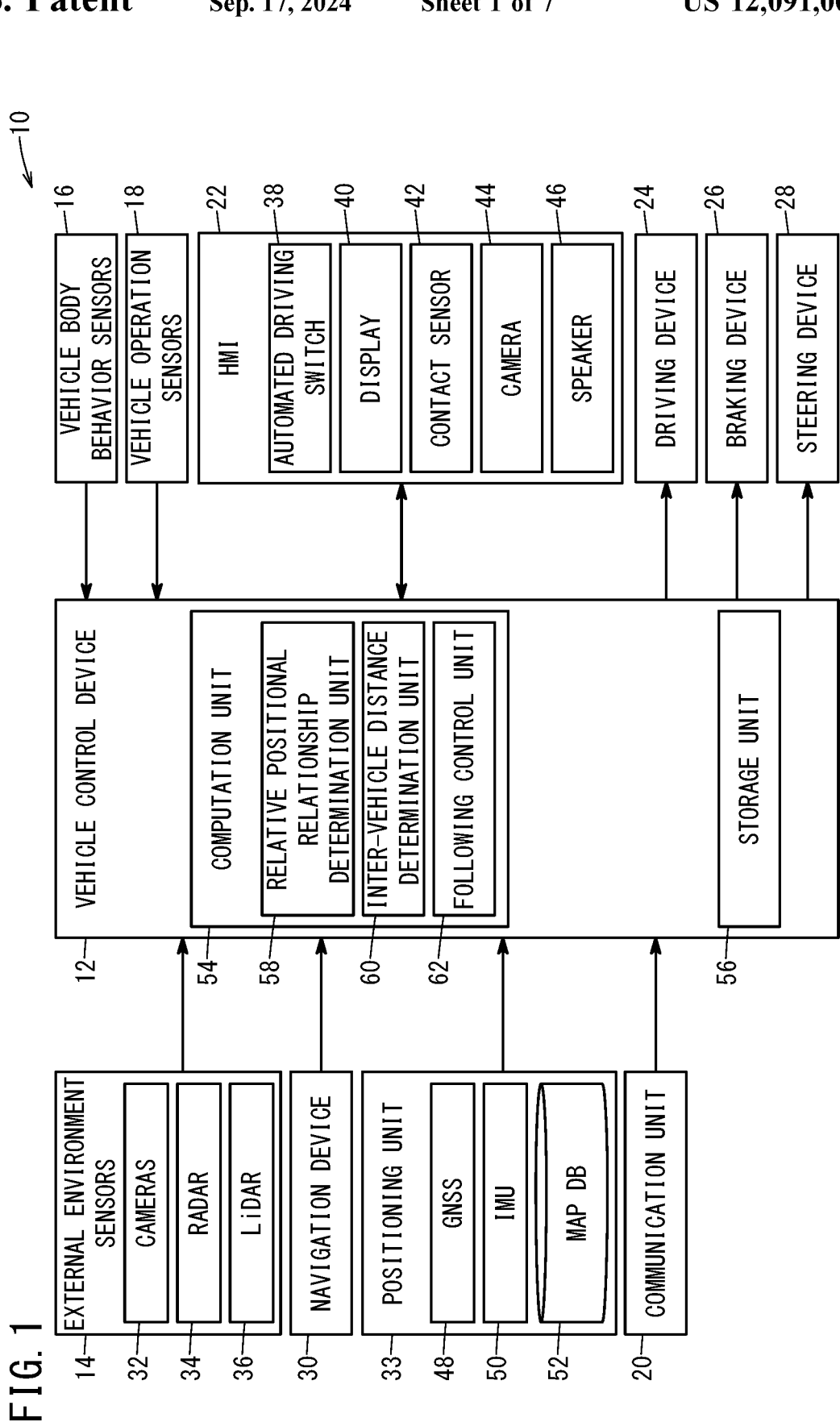
FIG. 1 is a block diagram showing a vehicle equipped with a vehicle control device according to an embodiment of the present invention.

A vehicle control device and a vehicle control method according to the embodiment will be described with reference to the drawings. FIG. 1 is a block diagram showing a vehicle equipped with the vehicle control device according to the present embodiment.

A vehicle (host vehicle) 10 is equipped with a vehicle control device 12, namely, a vehicle control ECU (Electronic Control Unit). The vehicle 10 is further equipped with external environment sensors 14, vehicle body behavior sensors 16, vehicle operation sensors 18, a communication unit 20, and an HMI (Human Machine Interface) 22. The vehicle 10 is further equipped with a driving device 24, a braking device 26, a steering device 28, a navigation device 30, and a positioning unit 33.

The external environment sensors 14 acquire external environmental information, that is, peripheral information about the vicinity of the vehicle 10. The external environment sensors 14 include a plurality of cameras 32 and a plurality of radar devices 34. Among the external environment sensors 14, there are further included a plurality of LiDAR (Light Detection And Ranging, Laser Imaging Detection and Ranging) devices 36.

Information acquired by the cameras (imaging units) 32, i.e., camera information, is supplied from the cameras 32 to the vehicle control device 12. As such camera information, there may be cited captured image information and the like. The camera information, together with radar information and LiDAR information to be described later, makes up the external environmental information. Although a single camera 32 is illustrated in FIG. 1, a plurality of cameras 32 are actually provided.

The radar devices 34 emit transmitted waves toward the exterior of the vehicle 10, and receive reflected waves that are reflected by detected objects and returned, among the transmitted waves that have been emitted. As examples of the transmitted waves, there may be cited electromagnetic waves. As examples of the electromagnetic waves, there may be cited millimeter waves. As examples of the detected objects, there may be cited other vehicles including a preceding vehicle 70. The radar devices 34 generate radar information (reflected wave signals) based on the reflected waves or the like. The radar devices 34 supply the generated radar information to the vehicle control device 12. Although one radar device 34 is illustrated in FIG. 1, a plurality of radar devices 34 are actually provided in the vehicle 10. Moreover, the radar devices 34 are not limited to using millimeter wave radar. For example, laser radar devices, or ultrasonic sensors or the like may be used as the radar devices 34.

The LiDAR devices 36 continuously irradiate lasers in all directions of the vehicle 10, measure the three-dimensional position of reflection points based on reflected waves of the emitted lasers, and output information related to the three-dimensional positions, i.e., three dimensional information. The LiDAR devices 36 supply the three-dimensional information, i.e., LiDAR information, to the vehicle control device 12. Although one LiDAR device 36 is illustrated in FIG. 1, a plurality of LiDAR devices 36 are actually provided in the vehicle 10.

The vehicle body behavior sensors 16 acquire information related to the behavior of the vehicle 10, namely, vehicle body behavior information. The vehicle body behavior sensors 16 include a non-illustrated vehicle speed sensor, non-illustrated vehicle wheel speed sensors, a non-illustrated acceleration sensor, and a non-illustrated yaw rate sensor. The vehicle speed sensor detects the speed of the vehicle 10, i.e., the vehicle speed. Further, the vehicle speed sensor detects the direction in which the vehicle 10 is traveling. The vehicle wheel speed sensors detect the speed of the non-illustrated vehicle wheels, i.e., the vehicle wheel speed. The acceleration sensor detects the acceleration of the vehicle 10. The term "acceleration" includes a longitudinal acceleration, a lateral acceleration, and a vertical acceleration. It should be noted that the acceleration of only a portion of the aforementioned directions may be detected by the acceleration sensor. The yaw rate sensor detects a yaw rate of the vehicle 10.

The vehicle operation sensors (driving operation sensors) 18 acquire information related to driving operations made by a user (driver), namely, driving operation information. The vehicle operation sensors 18 include a non-illustrated accelerator pedal sensor, a non-illustrated brake pedal sensor, a non-illustrated steering angle sensor, and a non-illustrated steering torque sensor. The accelerator pedal sensor detects an operated amount of a non-illustrated accelerator pedal. The brake pedal sensor detects an operated amount of a non-illustrated brake pedal. The steering angle sensor detects the steering angle of a non-illustrated steering wheel. The torque sensor detects a torque applied to the steering wheel.

The communication unit 20 performs wireless communications with non-illustrated external equipment. The external equipment may include, for example, a non-illustrated external server. The communication unit 20 may be capable of being detached from the vehicle 10, or may be non-detachable with respect to the vehicle. As examples of the communication unit 20 that can be attached to and detached from the vehicle 10, there may be cited a mobile phone and a smartphone.

The HMI 22 receives an operation input made by the user (vehicle occupant), and provides various types of information to the user in a visual, audible, or tactile manner. The HMI 22 includes, for example, an automated driving switch (driving assist switch) 38, a display 40, a contact sensor 42, a camera 44, and a speaker 46.

The automated driving switch 38 is used by the user in order to instruct starting or stopping of automated driving. The automated driving switch 38 includes a non-illustrated start switch and a non-illustrated stop switch. The start switch outputs a start signal to the vehicle control device 12 in accordance with an operation of the user. The stop switch outputs a stop signal to the vehicle control device 12 in accordance with an operation of the user.

The display (display unit) 40 includes, for example, a liquid crystal panel or an organic EL panel. In this instance, although an exemplary case will be described in which the display 40 is a touch panel, the present invention is not limited to this feature.

The contact sensor 42 serves to detect whether or not the user (driver) is touching the steering wheel. Signals output from the contact sensor 42 are supplied to the vehicle control device 12. On the basis of input signals supplied from the contact sensor 42, the vehicle control device 12 is capable of determining whether or not the user is touching the steering wheel.

The camera 44 captures images of the interior of the vehicle 10, i.e., a non-illustrated vehicle compartment interior. The camera 44 may be disposed, for example, on a non-illustrated dashboard, or may be disposed on a non-illustrated ceiling of the vehicle 10. Further, the camera 44 may be disposed in a manner so that images are captured of only the driver, or may be disposed in a manner so that images are captured of each of the vehicle occupants. The camera 44 outputs information acquired by capturing images of the vehicle compartment interior, i.e., image information, to the vehicle control device 12.

The speaker (notification unit) 46 serves to provide various types of information to the user by way of sound or voice. The vehicle control device 12 outputs various notifications, alarms, or the like using the speaker 46.

The driving device (driving force control system) 24 includes a non-illustrated drive ECU, and a non-illustrated drive source. By controlling the drive source, the drive ECU controls the driving force (torque) of the vehicle 10. As examples of the drive source, there may be cited an engine or a drive motor. The drive ECU is capable of controlling the driving force by controlling the drive source, based on an operation performed by the user on the accelerator pedal. Further, the drive ECU is capable of controlling the driving force by controlling the drive source, based on a command supplied from the vehicle control device 12. The driving force of the drive source is transmitted to the non-illustrated vehicle wheels via a non-illustrated transmission or the like.

The braking device (braking force control system) 26 includes a non-illustrated brake ECU, and a non-illustrated brake mechanism. The brake mechanism actuates a brake member by a brake motor, a hydraulic mechanism, or the like. The brake ECU is capable of controlling the braking force by controlling the drive mechanism, based on an operation performed by the user on the brake pedal. Further, the brake ECU is capable of controlling the braking force by controlling the brake mechanism, based on a command supplied from the vehicle control device 12.

The steering device (steering system) 28 includes a non-illustrated steering ECU, and more specifically, an EPS (electric power steering system) ECU, and a non-illustrated steering motor. The steering ECU controls the direction of the vehicle wheels (steering wheels), by controlling the steering motor, based on an operation performed by the user on the steering wheel. Further, the steering ECU controls the direction of the vehicle wheels by controlling the steering motor, based on a command supplied from the vehicle control device 12. Steering may be performed by changing the torque distribution and the braking force distribution to the left and right vehicle wheels.

The navigation device 30 is equipped with a non-illustrated GNSS (Global Navigation Satellite System) sensor. In addition, the navigation device 30 is further equipped with a non-illustrated computation unit and a non-illustrated storage unit. The GNSS sensor detects the current position of the vehicle 10. From a map database stored in the storage unit, the computation unit reads out map information corresponding to the current position detected by the GNSS sensor. Using the map information, the computation unit determines a target route from the current position to a destination. The destination is input by the user via the HMI 22. As described above, the display 40 is a touch panel. The destination is input by the touch panel being operated by the user. The navigation device 30 outputs the created target route to the vehicle control device 12. The vehicle control device 12 supplies the target route to the HMI 22. The HMI 22 displays the target route on the display 40.

The positioning unit 33 is equipped with a GNSS 48. The positioning unit 33 is further provided with an IMU (Inertial Measurement Unit) 50 and a map database (map DB) 52. The positioning unit 33 specifies the position of the vehicle 10, by appropriately using the information obtained by the GNSS 48, the information obtained by the IMU 50, and the map information stored in the map database 52.

The vehicle control device 12 is equipped with a computation unit 54 and a storage unit 56. The computation unit 54 governs the overall control of the vehicle control device 12. The computation unit 54 is constituted, for example, by a CPU (Central Processing Unit). The computation unit 54 executes the vehicle control by controlling each of the units based on programs stored in the storage unit 56.

The computation unit 54 includes a relative positional relationship determination unit 58, an inter-vehicle distance determination unit 60, and a following control unit 62. The relative positional relationship determination unit 58, the inter-vehicle distance determination unit 60, and the following control unit 62 can be realized by the computation unit 54 executing programs which are stored in the storage unit 56.

The storage unit 56 includes a non-illustrated volatile memory, and a non-illustrated nonvolatile memory. As an example of the volatile memory, there may be cited a RAM (Random Access Memory). As an example of the nonvolatile memory, there may be cited a ROM (Read Only Memory), a flash memory, or the like. The external environmental information, the vehicle body behavior information, and the vehicle operation information, and the like, are stored, for example, in the volatile memory. Programs, tables, maps, and the like are stored, for example, in the nonvolatile memory.

The relative positional relationship determination unit 58 determines a relative positional relationship, and more specifically, determines a relative positional relationship between the host vehicle 10 and the preceding vehicle 70, based on an operation made by the user. The relative positional relationship serves to indicate a degree of distance between the host vehicle 10 and the preceding vehicle 70, or stated otherwise, a degree of the inter-vehicle distance. The relative positional relationship, for example, can be specified in four stages of S (small), M (medium), L (large), and XL (extra-large), however, the present invention is not necessarily limited to this feature. The relative positional relationship may be specified in two stages, three stages, or five or more stages. As described above, the display 40 is a touch panel. The relative positional relationships S, M, L, and XL can be input by the touch panel being operated by the user. Moreover, in this instance, although an exemplary case has been described in which the relative positional relationships S, M, L, and XL are input by operation of the touch panel, the present invention is not limited to this feature. A switch or the like may be provided in the HMI 22 in order to input the relative positional relationships S, M, L, and XL. Then, the relative positional relationships S, M, L, and XL may be input by such a switch being operated by the user.

The following control, which is a control in which the host vehicle 10 follows the preceding vehicle 70, includes, for example, a control state A, a control state B, and a control state C. In the control state B, the burden on the driver is lighter than in the control state A, or alternatively, the degree of automation is higher than in the control state A. In the control state A, for example, the driver is required to grip the steering wheel. However, in the control state B, for example, the driver is not required to grip the steering wheel. In the control state C, the burden on the driver is lighter than in the control state B, or alternatively, the degree of automation is higher than in the control state B.

Figure 2A:
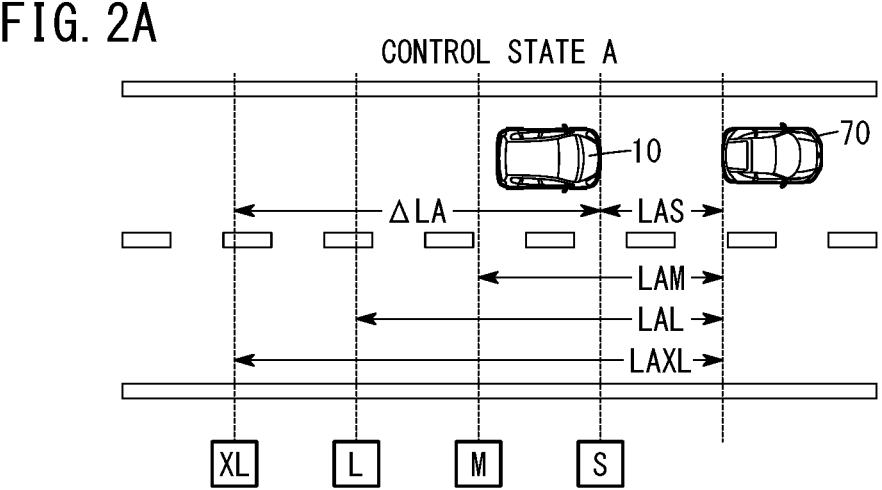
FIGS. 2A, 2B and 2C are diagrams conceptually showing examples of the inter-vehicle distance in each of control states.

FIG. 2A is a diagram conceptually illustrating an example of the inter-vehicle distance in the control state A. In the control state A, the inter-vehicle distance is controlled in the following manner. More specifically, in the case that the relative positional relationship is S, the inter-vehicle distance is LAS. In the case that the relative positional relationship is M, the inter-vehicle distance is LAM. In the case that the relative positional relationship is L, the inter-vehicle distance is LAL. In the case that the relative positional relationship is XL, the inter-vehicle distance is LAXL. It should be noted that the symbols LA are used to generally describe the inter-vehicle distance in the control state A, and the symbols LAS, LAM, LAL, and LAXL are used to describe individual instances of the inter-vehicle distance in the control state A. The inter-vehicle distance LA changes in accordance with the speed of the vehicle 10.

Figure 2B:
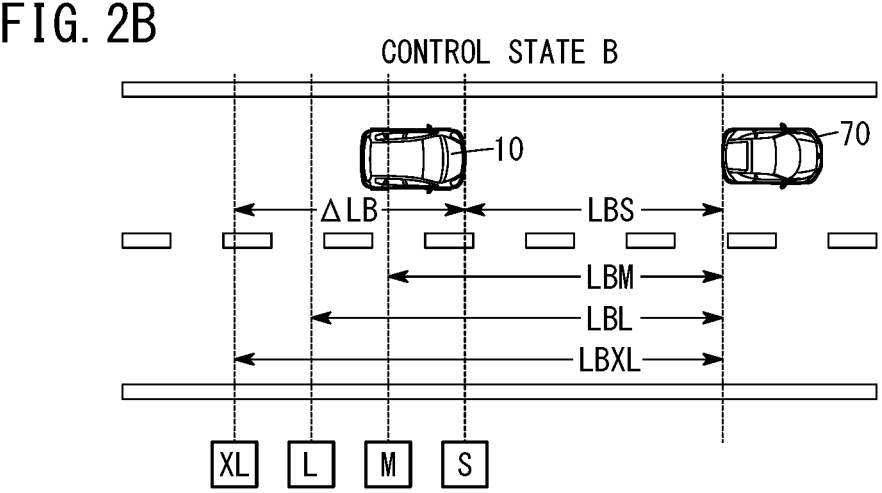

FIG. 2B is a diagram conceptually illustrating an example of the inter-vehicle distance in the control state B. In the control state B, the inter-vehicle distance is controlled in the following manner. More specifically, in the case that the relative positional relationship is S, the inter-vehicle distance is LBS. In the case that the relative positional relationship is M, the inter-vehicle distance is LBM. In the case that the relative positional relationship is L, the inter-vehicle distance is LBL. In the case that the relative positional relationship is XL, the inter-vehicle distance is LBXL. The inter-vehicle distances LBS, LBM, LBL, and LBXL change in accordance with the speed of the vehicle 10. It should be noted that the symbols LB are used to generally describe the inter-vehicle distance in the control state B, and the symbols LBS, LBM, LBL, and LBXL are used to describe individual instances of the inter-vehicle distance in the control state B. The inter-vehicle distance LB changes in accordance with the speed of the vehicle 10.

Figure 2C:
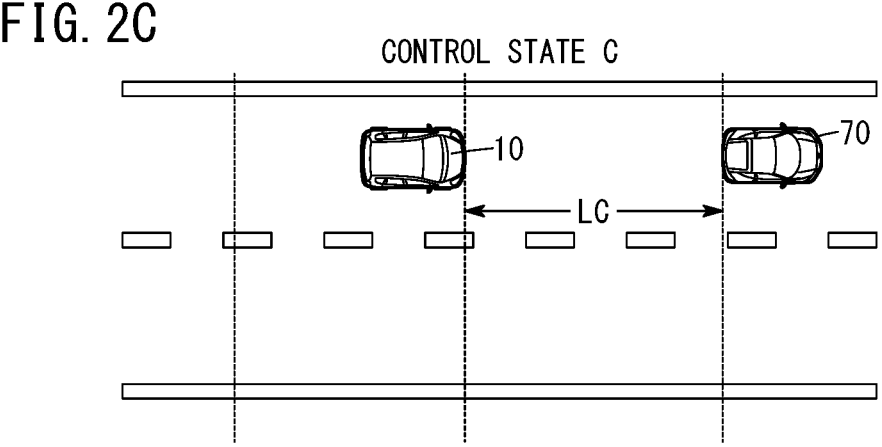

FIG. 2C is a diagram conceptually illustrating an example of the inter-vehicle distance in the control state C. The inter-vehicle distance in the control state C is LC. The inter-vehicle distance LC changes in accordance with the speed of the vehicle 10.

The inter-vehicle distance determination unit 60 determines the inter-vehicle distances LA and LB, based on the relative positional relationships S, M, L, and XL determined by the relative positional relationship determination unit 58. More specifically, the inter-vehicle distance determination unit 60 determines the inter-vehicle distances LA and LB on the basis of the relative positional relationships S, M, L, and XL, and the vehicle speed. A table indicating a relationship between the relative positional relationships S, M, L, and XL, the vehicle speed, and the inter-vehicle distances LA and LB is stored in advance in the storage unit 56. Using the table, the inter-vehicle distance determination unit 60 determines the inter-vehicle distances LA and LB. In this instance, although an exemplary case has been described in which a table is used, the present invention is not necessarily limited to this feature. For example, the inter-vehicle distances LA and LB may be calculated on the basis of a predetermined calculation formula. The predetermined calculation formula is a formula indicative of a relationship between the relative positional relationships S, M, L, and XL, the vehicle speed, and the inter-vehicle distances LA and LB.

The minimum value of the inter-vehicle distance that can be determined by the inter-vehicle distance determination unit 60 in the control state B, i.e., the inter-vehicle distance LBS, is greater than the minimum value of the inter-vehicle distance that can be determined by the inter-vehicle distance determination unit 60 in the control state A, i.e., the inter-vehicle distance LAS. Stated otherwise, when the relative positional relationship is set to S, the inter-vehicle distance LBS in the control state B is longer than the inter-vehicle distance LAS in the control state A.

The reason why the inter-vehicle distance LBS is longer than the inter-vehicle distance LAS is as follows. More specifically, the burden on the driver in the control state B is lighter than the burden on the driver in the control state A, or alternatively, the degree of automation in the control state B is higher than the degree of automation in the control state A. In the control state A, for example, the driver is required to grip the steering wheel. However, in the control state B, for example, the driver is not required to grip the steering wheel. In such a case, the time required until the driver is capable of operating the vehicle 10, or stated otherwise, the time required for the change in driving to occur is longer in the case of the control state B than in the case of the control state A. Accordingly, the inter-vehicle distance LBS is set to be longer than the inter-vehicle distance LAS.

For the same reasons, the inter-vehicle distance LBM is set to be longer than the inter-vehicle distance LAM. Further, for the same reasons, the inter-vehicle distance LBL is set to be longer than the inter-vehicle distance LAL. Further, for the same reasons, the inter-vehicle distance LBXL is set to be longer than the inter-vehicle distance LAXL.

The maximum adjustable range ΔLB of the inter-vehicle distance that can be adjusted by the inter-vehicle distance determination unit 60 in the control state B (see FIG. 2B) is narrower than the maximum adjustable range ΔLA of the inter-vehicle distance that can be adjusted by the inter-vehicle distance determination unit 60 in the control state A (see FIG. 2A). The reason why the maximum adjustable range ΔLB is narrower than the maximum adjustable range ΔLA is because the inter-vehicle distance LBS is set to be longer than the inter-vehicle distance LAS.

In the control state C, the inter-vehicle distance determination unit 60 determines the inter-vehicle distance LC on the basis of a distance determined in advance. More specifically, in the control state C, the inter-vehicle distance determination unit 60 sets the inter-vehicle distance LC as a predetermined distance. The control state C can be used, for example, in the case that a traffic jam or the like is occurring. For this reason, the upper limit of the speed of the host vehicle 10 in the control state C is lower than the upper limit of the speed of the host vehicle 10 in the control states A and B.

In order to prevent the vehicle from being interrupted by other vehicles at a time of a traffic jam, when the relative positional relationship is maximum, the inter-vehicle distance LC in the control state C is shorter than the inter-vehicle distances LAXL and LBXL in the control states A and B.

In the case that the relative positional relationships S, M, L, and XL are changed in the control state A, the inter-vehicle distance determination unit 60 is capable of determining the inter-vehicle distances LBS, LBM, LBL, and LBXL, based on the changed relative positional relationships S, M, L, and XL in the control state B. In the case that the relative positional relationships S, M, L, and XL are changed in the control state B, the inter-vehicle distance determination unit 60 is capable of determining the inter-vehicle distances LAS, LAM, LAL, and LAXL, based on the changed relative positional relationships S, M, L, and XL in the control state A. In this manner, in the case that the relative positional relationships S, M, L, and XL are changed in one of the control state A and the control state B, the inter-vehicle distance determination unit 60 operates in the following manner. More specifically, the inter-vehicle distance determination unit 60 can determine the inter-vehicle distances LAS to LAXL and LBS to LBXL on the basis of the changed relative positional relationships S, M, L, and XL in the other of the control state A and the control state B.

In the case that the relative positional relationships S, M, L, and XL are changed by the relative positional relationship determination unit 58 while the host vehicle 10 is stopped, the following control unit 62 is capable of operating in the following manner. More specifically, after having started the host vehicle 10, the following control unit 62 can apply the inter-vehicle distances LAS to LAXL and LBS to LBXL determined by the inter-vehicle distance determination unit 60, based on the changed relative positional relationships S, M, L, and XL.

The inter-vehicle distance determination unit 60 is capable of determining the inter-vehicle distances LAS to LAXL and LBS to LBXL for when the host vehicle 10 is stopped, based on, for example, the relative positional relationships S, M, L, and XL determined by the relative positional relationship determination unit 58.

The following control unit 62 performs the following control with respect to the preceding vehicle 70, based on the inter-vehicle distances LAS to LAXL and LBS to LBXL determined by the inter-vehicle distance determination unit 60.

Figure 3:
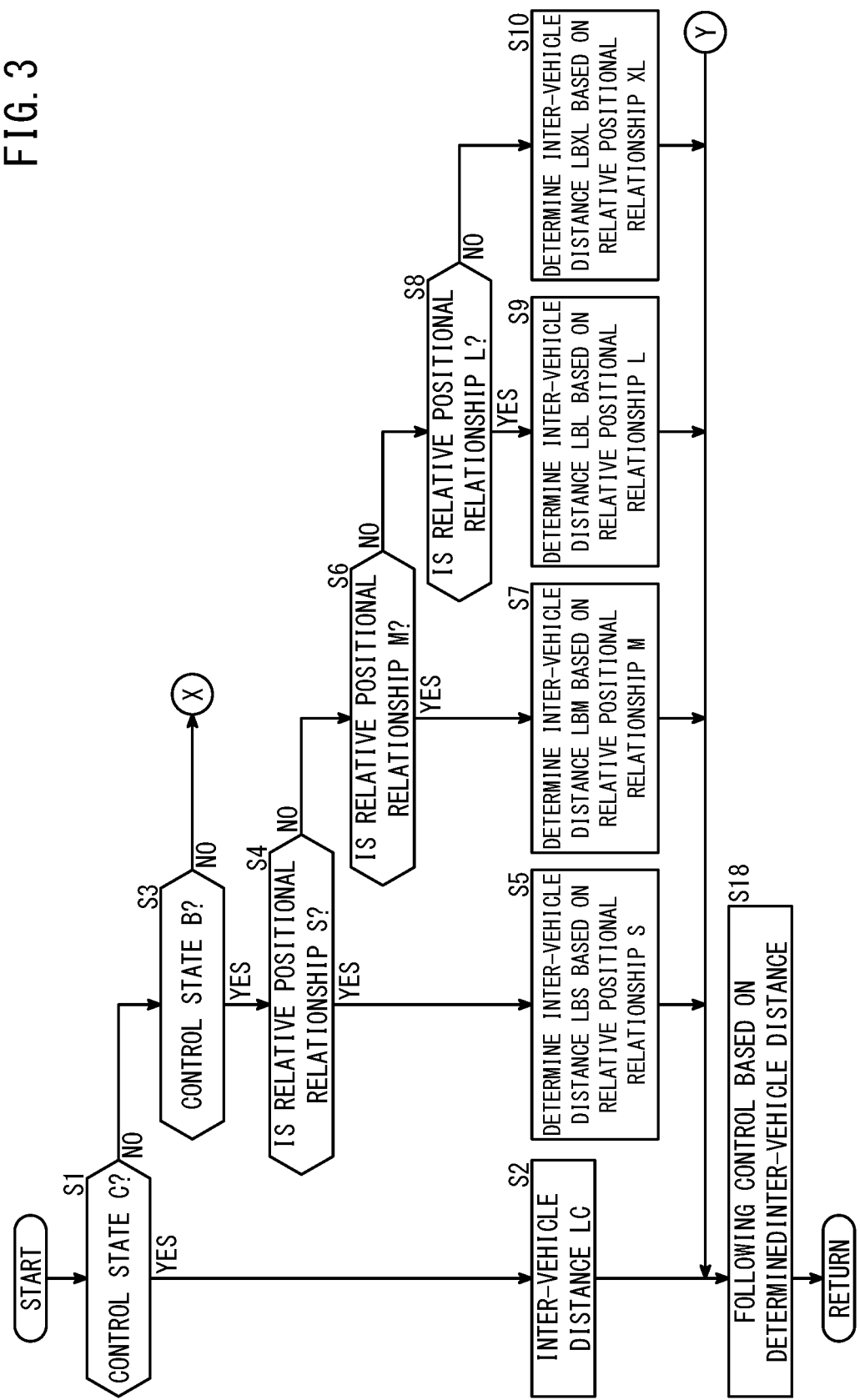
FIG. 3 is a flowchart showing an example of operations of the vehicle control device according to the embodiment.
Figure 4:
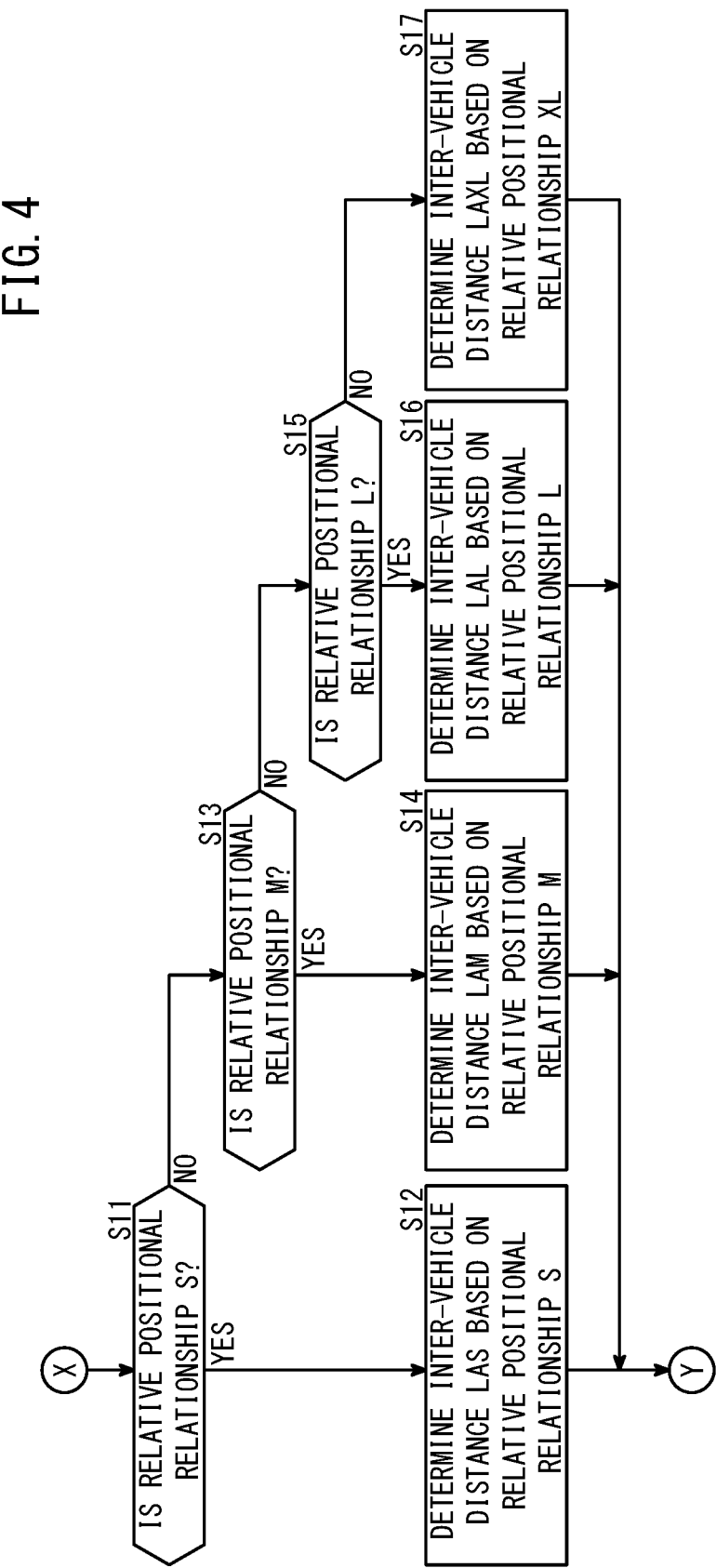
FIG. 4 is a flowchart showing an example of operations of the vehicle control device according to the embodiment.

Next, operations of the vehicle control device 12 according to the present embodiment will be described. FIGS. 3 and 4 are flowcharts showing examples of the operations of the vehicle control device according to the present embodiment.

In step S1, the computation unit 54 determines whether or not the current control state is the control state C. If the current control state is the control state C (YES in step S1), the process transitions to step S2. If the current control state is not the control state C (NO in step S1), the process transitions to step S3.

In step S2, the inter-vehicle distance determination unit 60 determines the inter-vehicle distance LC on the basis of a distance determined in advance. Thereafter, the process transitions to step S18.

In step S3, the computation unit 54 determines whether or not the current control state is the control state B. If the current control state is the control state B (YES in step S3), the process transitions to step S4. If the current control state is not the control state B (NO in step S3), the process transitions to step S11 (see FIG. 4).

In step S4, the relative positional relationship determination unit 58 determines whether or not the relative positional relationship is set to S. In the case that the relative positional relationship is set to S (YES in step S4), the process transitions to step S5. In the case that the relative positional relationship is not set to S (NO in step S4), the process transitions to step S6.

In step S5, the inter-vehicle distance determination unit 60 determines the inter-vehicle distance LBS on the basis of the relative positional relationship S. More specifically, the inter-vehicle distance determination unit 60 determines the inter-vehicle distance LBS on the basis of the relative positional relationship S and the speed of the vehicle 10. Thereafter, the process transitions to step S18.

In step S6, the relative positional relationship determination unit 58 determines whether or not the relative positional relationship is set to M. In the case that the relative positional relationship is set to M (YES in step S6), the process transitions to step S7. In the case that the relative positional relationship is not set to M (NO in step S6), the process transitions to step S8.

In step S7, the inter-vehicle distance determination unit 60 determines the inter-vehicle distance LBM on the basis of the relative positional relationship M. More specifically, the inter-vehicle distance determination unit 60 determines the inter-vehicle distance LBM on the basis of the relative positional relationship M and the speed of the vehicle 10. Thereafter, the process transitions to step S18.

In step S8, the relative positional relationship determination unit 58 determines whether or not the relative positional relationship is set to L. In the case that the relative positional relationship is set to L (YES in step S8), the process transitions to step S9. In the case that the relative positional relationship is not set to L (NO in step S8), and more specifically, if the relative positional relationship is XL, the process transitions to step S10.

In step S9, the inter-vehicle distance determination unit 60 determines the inter-vehicle distance LBL on the basis of the relative positional relationship L. More specifically, the inter-vehicle distance determination unit 60 determines the inter-vehicle distance LBL on the basis of the relative positional relationship L and the speed of the vehicle 10. Thereafter, the process transitions to step S18.

In step S10, the inter-vehicle distance determination unit 60 determines the inter-vehicle distance LBXL on the basis of the relative positional relationship XL. More specifically, the inter-vehicle distance determination unit 60 determines the inter-vehicle distance LBXL on the basis of the relative positional relationship XL and the speed of the vehicle 10. Thereafter, the process transitions to step S18.

In step S11, the relative positional relationship determination unit 58 determines whether or not the relative positional relationship is set to S. In the case that the relative positional relationship is set to S (YES in step S11), the process transitions to step S12. In the case that the relative positional relationship is not set to S (NO in step S11), the process transitions to step S13.

In step S12, the inter-vehicle distance determination unit 60 determines the inter-vehicle distance LAS on the basis of the relative positional relationship S. More specifically, the inter-vehicle distance determination unit 60 determines the inter-vehicle distance LAS on the basis of the relative positional relationship S and the speed of the vehicle 10. Thereafter, the process transitions to step S18.

In step S13, the relative positional relationship determination unit 58 determines whether or not the relative positional relationship is set to M. In the case that the relative positional relationship is set to M (YES in step S13), the process transitions to step S14. In the case that the relative positional relationship is not set to M (NO in step S13), the process transitions to step S15.

In step S14, the inter-vehicle distance determination unit 60 determines the inter-vehicle distance LAM on the basis of the relative positional relationship M. More specifically, the inter-vehicle distance determination unit 60 determines the inter-vehicle distance LAM on the basis of the relative positional relationship M and the speed of the vehicle 10. Thereafter, the process transitions to step S18.

In step S15, the relative positional relationship determination unit 58 determines whether or not the relative positional relationship is set to L. In the case that the relative positional relationship is set to L (YES in step S15), the process transitions to step S16. In the case that the relative positional relationship is not set to L (NO in step S15), and more specifically, if the relative positional relationship is XL, the process transitions to step S17.

In step S16, the inter-vehicle distance determination unit 60 determines the inter-vehicle distance LAL on the basis of the relative positional relationship L. More specifically, the inter-vehicle distance determination unit 60 determines the inter-vehicle distance LAL on the basis of the relative positional relationship L and the speed of the vehicle 10. Thereafter, the process transitions to step S18.

In step S17, the inter-vehicle distance determination unit 60 determines the inter-vehicle distance LAXL on the basis of the relative positional relationship XL. More specifically, the inter-vehicle distance LAXL on the basis of the relative positional relationship XL and the speed of the vehicle 10. Thereafter, the process transitions to step S18.

In step S18, the following control unit 62 performs the following control with respect to the preceding vehicle 70, based on the inter-vehicle distances LAS to LAXL, LBS to LBXL, and LC determined by the inter-vehicle distance determination unit 60.

Figure 5:
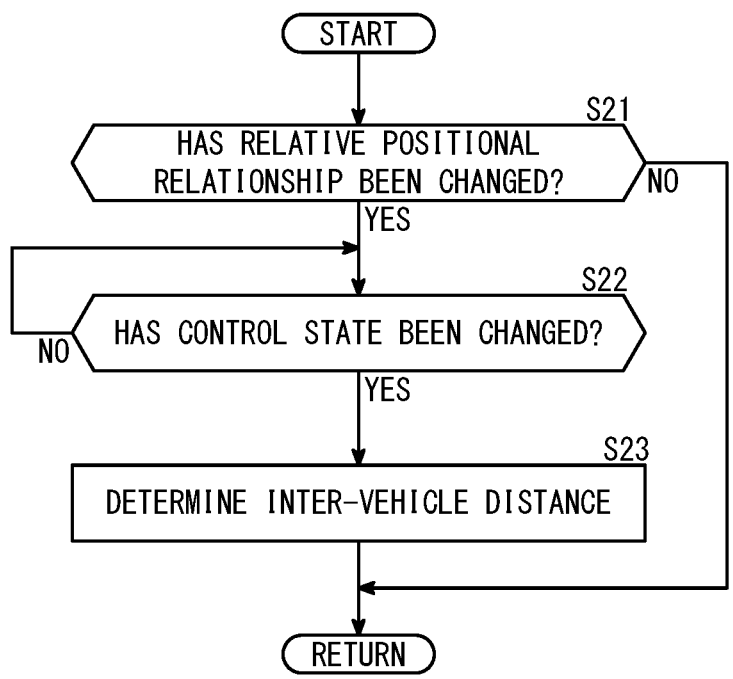
FIG. 5 is a flowchart showing an example of operations of the vehicle control device according to the embodiment.

FIG. 5 is a flowchart showing an example of operations of the vehicle control device according to the present embodiment.

In step S21, the relative positional relationship determination unit 58 determines whether or not a change in the relative positional relationship has been carried out by an operation made by the user. In the case that the relative positional relationship has been changed (YES in step S21), the process transitions to step S22. In the case that the relative positional relationship has not been changed (NO in step S21), the process shown in FIG. 5 is brought to an end.

In step S22, the computation unit 54 determines whether or not the control state has been changed by the following control unit 62. In the case that changing of the control state is performed (YES in step S22), the process transitions to step S23. In the case that changing of the control state is not performed (NO in step S22), step S22 is repeated.

In step S23, the inter-vehicle distance determination unit 60 carries out the following process. More specifically, in the case that the changed control state is the control state A, the inter-vehicle distance determination unit 60 determines the inter-vehicle distances LAS to LAXL on the basis of the changed relative positional relationships S, M, L, and XL. In the case that the changed control state is the control state B, the inter-vehicle distance determination unit 60 determines the inter-vehicle distances LBS to LBXL on the basis of the changed relative positional relationships S, M, L, and XL. Moreover, in the case that the changed control state is the control state C, the inter-vehicle distance determination unit 60 determines the inter-vehicle distance LC without being based on the changed relative positional relationships S, M, L, and XL.

Figure 6:
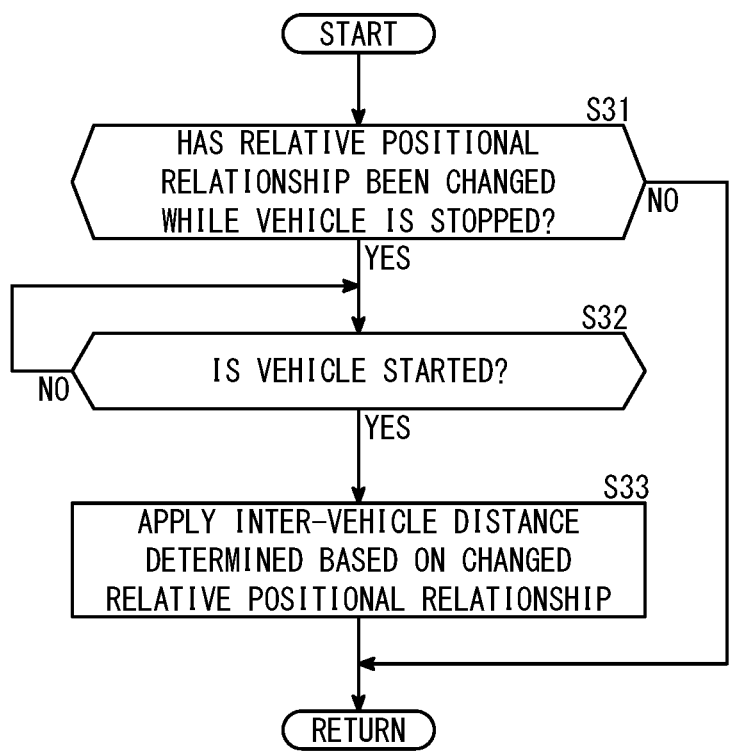
FIG. 6 is a flowchart showing an example of operations of the vehicle control device according to the embodiment.

FIG. 6 is a flowchart showing an example of operations of the vehicle control device according to the present embodiment.

In step S31, the computation unit 54 determines whether or not the relative positional relationship has been changed while the vehicle 10 is stopped. In the case that the relative positional relationship is changed while the vehicle 10 is stopped (YES in step S31), the process transitions to step S32. In the case that the relative positional relationship has not been changed while the vehicle 10 is stopped (NO in step S31), the process shown in FIG. 6 is brought to an end.

In step S32, the computation unit 54 determines whether or not the vehicle 10 has been started. In the case that the vehicle 10 has been started (YES in step S32), the process transitions to step S33. In the case that the vehicle 10 is not started (NO in step S32), step S32 is repeated.

In step S33, the following control unit 62 applies the inter-vehicle distances LAS to LAXL and LBS to LBXL determined by the inter-vehicle distance determination unit 60, based on the changed relative positional relationships S, M, L, and XL.

In the foregoing manner, according to the present embodiment, the inter-vehicle distances LAS to LAXL and LBS to LBXL are determined on the basis of the relative positional relationships S, M, L, and XL determined based on operations made by the user. Therefore, according to the present embodiment, it is possible to appropriately set the inter-vehicle distances LAS to LAXL and LBS to LBXL in accordance with the driving ability of the user or the like.

In addition, according to the present embodiment, the inter-vehicle distances LAS to LAXL, LBS to LBXL, and LC are determined in accordance with the current control state A, B, or C. Therefore, according to the present embodiment, it is possible to appropriately set the inter-vehicle distances LAS to LAXL, LBS to LBXL, and LC in accordance with the current control state A, B, or C.

Modified Embodiments

Although preferred embodiments of the present invention have been described above, the present invention is not limited to the above-described embodiments, and various modifications can be made thereto without departing from the essence and scope of the present invention.

Figure 7A:
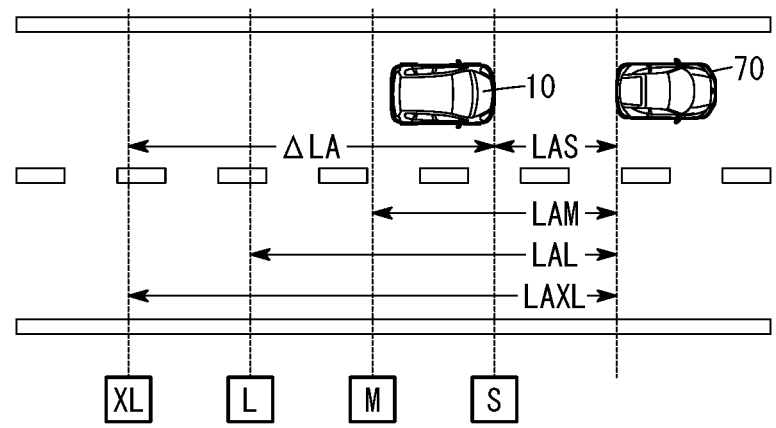
FIGS. 7A, 7B and 7C are diagrams conceptually showing other examples of the inter-vehicle distance in each of control states.
Figure 7B:
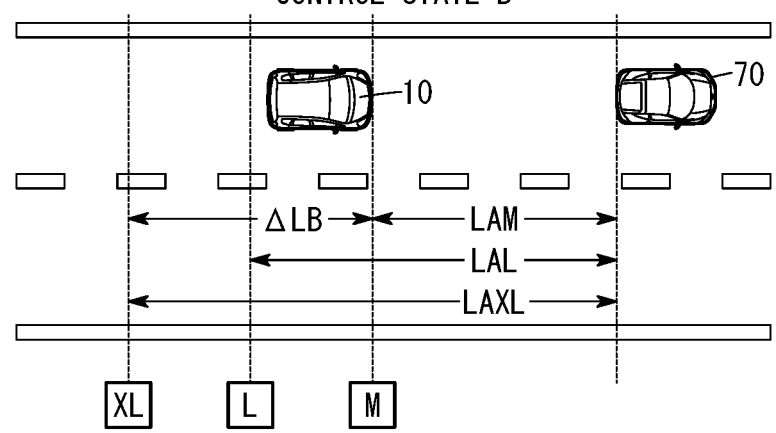
Figure 7C:
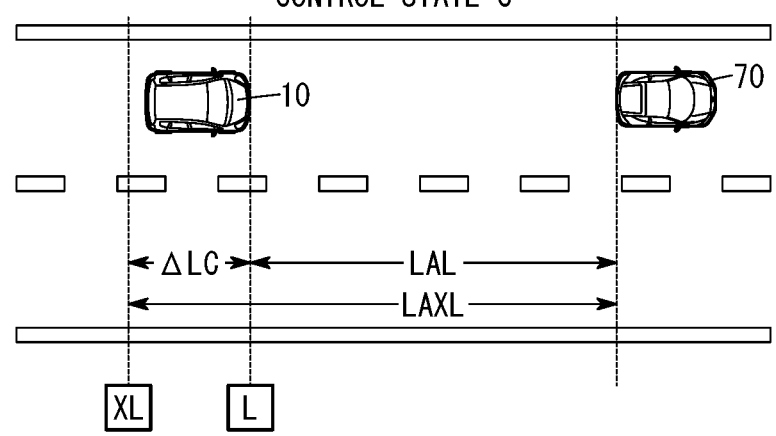

For example, the inter-vehicle distances in each of the control states may be set in the following manner. FIG. 7A is a diagram conceptually illustrating another example of the inter-vehicle distance in the control state A. In the control state A, the relative positional relationship can be set to any one of S, M, L, and XL. FIG. 7B is a diagram conceptually illustrating another example of the inter-vehicle distance in the control state B. In the control state B, the relative positional relationship can be set to M, L, or XL, but cannot be set to S. FIG. 7C is a diagram conceptually illustrating another example of the inter-vehicle distance in the control state C. In the control state C, the relative positional relationship can be set to L or XL, but cannot be set to S or M. The maximum adjustable range ΔLB of the inter-vehicle distance that can be adjusted by the inter-vehicle distance determination unit 60 in the control state B is narrower than the maximum adjustable range ΔLA of the inter-vehicle distance that can be adjusted by the inter-vehicle distance determination unit 60 in the control state A. Further, the maximum adjustable range ΔLC of the inter-vehicle distance that can be adjusted by the inter-vehicle distance determination unit 60 in the control state C is narrower than the maximum adjustable range ΔLB of the inter-vehicle distance that can be adjusted by the inter-vehicle distance determination unit 60 in the control state B. In a state in which the relative positional relationship is set, for example, to S in the control state A, and in the case that the control state transitions from the control state A to the control state B, the relative positional relationship determination unit 58, for example, sets the relative positional relationship to M in the control state B. In this case, the user may be notified, using the speaker 46 or the like, that the relative positional relationship has been changed from S to M. In a state in which the relative positional relationship is set, for example, to M in the control state B, and in the case that the control state transitions from the control state B to the control state A, the relative positional relationship determination unit 58, for example, sets the relative positional relationship to S in the control state A. In this case, the user may be notified, using the speaker 46 or the like, that the relative positional relationship has been changed from M to S.

Further, in both the control state A and the control state B, the relative positional relationship that is operated by the user may be set to S, M, L, or XL (see FIG. 7A), and the following process may be carried out by the relative positional relationship determination unit 58. For example, in the case that the relative positional relationship is operated to S by the user in the control state A, the relative positional relationship is set to S (see FIG. 7A) by the relative positional relationship determination unit 58. On the other hand, in the case that the relative positional relationship is operated to S by the user in the control state B, the relative positional relationship is set to M (see FIG. 7B) by the relative positional relationship determination unit 58. In this manner, in response to the operation made by the user, a predetermined conversion process may be performed by the relative positional relationship determination unit 58.

Summarizing the above-described embodiments and the modifications thereof, the characteristic features described below are realized.

The vehicle control device (12) includes the inter-vehicle distance determination unit (60) that determines the inter-vehicle distance (LAS to LAXL, LBS to LBXL) that is the distance between the host vehicle (10) and the preceding vehicle (70), and the following control unit (62) that performs the following control with respect to the preceding vehicle based on the inter-vehicle distance determined by the inter-vehicle distance determination unit, wherein the following control includes the first control state (A), and the second control state (B) in which the burden on the driver is lighter than in the first control state, or in which the degree of automation is higher than in the first control state, and the minimum value (LBS) of the inter-vehicle distance that can be determined by the inter-vehicle distance determination unit in the second control state is greater than the minimum value (LAS) of the inter-vehicle distance that can be determined by the inter-vehicle distance determination unit in the first control state. Since the time required until the driver is capable of operating the vehicle is longer in the case of the second control state than in the case of the first control state, in the second control state, it is preferable that the inter-vehicle distance is set to be longer than in the first control state. In accordance with such a configuration, the inter-vehicle distance can be appropriately set according to the control state.

The vehicle control device includes the inter-vehicle distance determination unit that determines the inter-vehicle distance that is the distance between the host vehicle and the preceding vehicle, and the following control unit that performs the following control with respect to the preceding vehicle based on the inter-vehicle distance determined by the inter-vehicle distance determination unit, wherein the following control includes the first control state, and the second control state in which the burden on the driver is lighter than in the first control state, or in which the degree of automation is higher than in the first control state, and a maximum adjustable range (ΔLB) of the inter-vehicle distance that can be adjusted by the inter-vehicle distance determination unit in the second control state is narrower than a maximum adjustable range (ΔLA) of the inter-vehicle distance that can be adjusted by the inter-vehicle distance determination unit in the first control state. In accordance with such a configuration, the inter-vehicle distance can be appropriately set according to the control state.

The vehicle control device may further include the relative positional relationship determination unit (58) that determines the relative positional relationship (S, M, L, XL) between the host vehicle and the preceding vehicle on the basis of an operation made by a user, wherein the inter-vehicle distance determination unit may determine the inter-vehicle distance on the basis of the relative positional relationship determined by the relative positional relationship determination unit. In accordance with such a configuration, the relative positional relationship can be appropriately set by the user.

In the case that the relative positional relationship is changed in one of the first control state and the second control state, the inter-vehicle distance determination unit may determine the inter-vehicle distance on the basis of the changed relative positional relationship in the other of the first control state and the second control state. In accordance with such a configuration, even in the case that the control state has undergone a transition, the relative positional relationship set in the control state before such a transition is also handed over to the control state after the transition, thereby preventing the operation from becoming complex.

In the case that the relative positional relationship is changed while the host vehicle is stopped, the following control unit may apply the inter-vehicle distance, which is determined by the inter-vehicle distance determination unit on the basis of the changed relative positional relationship after the host vehicle has started. In accordance with such a configuration, the host vehicle does not start to move in order to adjust the inter-vehicle distance. In accordance with such a configuration, it is possible to prevent a behavior that imparts a sense of discomfort to the user from occurring in the vehicle.

The inter-vehicle distance determination unit may determine, on the basis of the relative positional relationship, the inter-vehicle distance for when the host vehicle is made to stop. In accordance with such a configuration, it is possible to prevent a behavior from occurring in the vehicle that imparts a sense of discomfort to the user when the vehicle is stopped.

The inter-vehicle distance in the second control state when the relative positional relationship is minimum may be longer than the inter-vehicle distance in the first control state when the relative positional relationship is minimum. Since the time required until the driver is capable of operating the vehicle is longer in the case of the second control state than in the case of the first control state, in the second control state, it is preferable that the inter-vehicle distance is set to be longer than in the first control state. In accordance with such a configuration, the inter-vehicle distance can be appropriately set according to the control state.

The vehicle control device includes the relative positional relationship determination unit that determines the relative positional relationship between the host vehicle and the preceding vehicle, the inter-vehicle distance determination unit that determines an inter-vehicle distance that is the distance between the host vehicle and the preceding vehicle on the basis of the relative positional relationship determined by the relative positional relationship determination unit, and the following control unit that performs the following control with respect to the preceding vehicle based on the inter-vehicle distance determined by the inter-vehicle distance determination unit, wherein the following control includes the first control state (A, B), and the second control state (C) in which the burden on the driver is lighter than in the first control state, or in which the degree of automation is higher than in the first control state, and in the first control state, the inter-vehicle distance determination unit determines the inter-vehicle distance (LAS to LAXL, LBS to LBXL) on the basis of the relative positional relationship determined by the relative positional relationship determination unit based on an operation made by the user, and in the second control state, the inter-vehicle distance determination unit determines the inter-vehicle distance (LC) on the basis of a distance determined in advance. In accordance with such a configuration, the inter-vehicle distance can be appropriately set according to the control state.

The upper limit of the speed of the host vehicle in the second control state may be lower than the upper limit of the speed of the host vehicle in the first control state.

The inter-vehicle distance (LC) in the second control state may be shorter than the inter-vehicle distance (LAXL, LBXL) in the first control state when the relative positional relationship is maximum. In accordance with such a configuration, it is possible to prevent the vehicle from being interrupted by other vehicles at a time of a traffic jam.

The vehicle control method includes the step (step S5, step S7, step S9, step S10, step S12, step S14, step S16, step S17) of determining the inter-vehicle distance that is the distance between the host vehicle and the preceding vehicle, and the step (step S18) of performing the following control with respect to the preceding vehicle based on the inter-vehicle distance determined in the step of determining the inter-vehicle distance, wherein the following control includes the first control state, and a second control state in which the burden on the driver is lighter than in the first control state, or in which the degree of automation is higher than in the first control state, and a minimum value of the inter-vehicle distance that can be determined in the step of determining the inter-vehicle distance in the second control state is greater than a minimum value of the inter-vehicle distance that can be determined in the step of determining the inter-vehicle distance in the first control state.

The vehicle control method includes the step of determining the inter-vehicle distance that is the distance between the host vehicle and the preceding vehicle, and the step of performing the following control with respect to the preceding vehicle based on the inter-vehicle distance determined in the step of determining the inter-vehicle distance, wherein the following control includes the first control state, and the second control state in which the burden on the driver is lighter than in the first control state, or in which the degree of automation is higher than in the first control state, and a maximum adjustable range of the inter-vehicle distance that can be adjusted in the second control state is narrower than a maximum adjustable range of the inter-vehicle distance that can be adjusted in the first control state.

The vehicle control method includes the step (step S4, step S6, step S8, step S11, step S13, step S15) of determining the relative positional relationship between the host vehicle and the preceding vehicle, the step (step S5, step S7, step S9, step S10, step S12, step S14, step S16, step S17) of determining the inter-vehicle distance that is the distance between the host vehicle and the preceding vehicle on the basis of the relative positional relationship determined in the step of determining the relative positional relationship, and the step (step S18) of performing the following control with respect to the preceding vehicle based on the inter-vehicle distance determined in the step of determining the inter-vehicle distance, wherein the following control includes the first control state (A, B), and the second control state (C) in which the burden on the driver is lighter than in the first control state, or in which the degree of automation is higher than in the first control state, and in the first control state, the inter-vehicle distance (LAS to LAXL, LBS to LBXL) is determined on the basis of the relative positional relationship based on an operation made by the user, and in the second control state, the inter-vehicle distance (LC) is determined on the basis of a distance determined in advance.

What is claimed is:
1. A vehicle control device, comprising one or more processors that execute computer-executable instructions stored in a memory,
wherein the one or more processors execute the computer-executable instructions to cause the vehicle control device to:

determine an inter-vehicle distance that is a distance between a host vehicle and a preceding vehicle; and perform a following control with respect to the preceding vehicle based on the inter-vehicle distance determined, wherein the following control includes a first control state, and a second control state in which a degree of automation is higher than in the first control state, a minimum value of the inter-vehicle distance determined in the second control state is greater than a minimum value of the inter-vehicle distance determined in the first control state, and a maximum adjustable range of the inter-vehicle distance adjustable in the second control state is narrower than a maximum adjustable range of the inter-vehicle distance adjustable in the first control state.

2. The vehicle control device according to claim 1, wherein the one or more processors further cause the vehicle control device to: determine a relative positional relationship between the host vehicle and the preceding vehicle based on an operation made by a user, and determine the inter-vehicle distance based on the relative positional relationship determined.

3. The vehicle control device according to claim 2, wherein, in a case that the relative positional relationship is changed in one of the first control state and the second control state, the one or more processors further cause the vehicle control device to determine the inter-vehicle distance based on the changed relative positional relationship in another of the first control state and the second control state.

4. The vehicle control device according to claim 2, wherein, in a case that the relative positional relationship is changed while the host vehicle is stopped, the one or more processors further cause the vehicle control device to apply the inter-vehicle distance, which is determined based on the changed relative positional relationship after the host vehicle has started.

5. The vehicle control device according to claim 2, wherein, the one or more processors further cause the vehicle control device to determine, based on the relative positional relationship, the inter-vehicle distance for when the host vehicle is made to stop.

6. The vehicle control device according to claim 2, wherein the inter-vehicle distance in the second control state when the relative positional relationship is minimum is longer than the inter-vehicle distance in the first control state when the relative positional relationship is minimum.

7. A vehicle control method, comprising:

a step of determining an inter-vehicle distance that is a distance between a host vehicle and a preceding vehicle; and a step of performing a following control with respect to the preceding vehicle based on the inter-vehicle distance determined in the step of determining the inter-vehicle distance, wherein the following control includes a first control state, and a second control state in which a degree of automation is higher than in the first control state, a minimum value of the inter-vehicle distance be determined in the step of determining the inter-vehicle distance in the second control state is greater than a minimum value of the inter-vehicle distance be determined in the step of determining the inter-vehicle distance in the first control state and a maximum adjustable range of the inter-vehicle distance be adjustable in the second control state is narrower than a maximum adjustable range of the inter-vehicle distance be adjustable in the first control state.

\* \* \* \* \*